(No Model.)
E. G. N. SALENIUS.
CENTRIFUGAL MACHINE.
No. 582,437. Patented May 11, 1897.
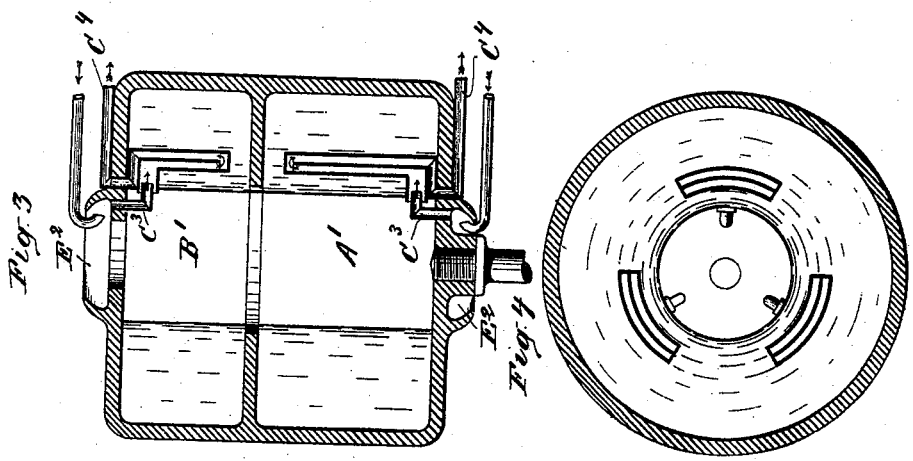
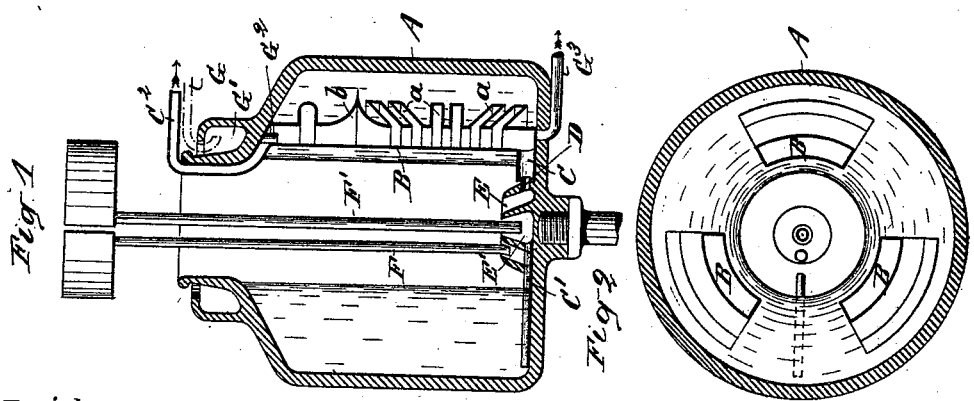
Witnesses:
Herbert Blossom
Peter A. Ross
Inventor:
Erik Gustaf Nicolaus Salenius
by Henry Connett
Attorney.

UNITED STATES PATENT OFFICE.

ERIK GUSTAF NICOLAUS SALENIUS, OF STOCKHOLM, SWEDEN, ASSIGNOR TO THE AKTIEBOLAGET RADIATOR, OF SAME PLACE.

CENTRIFUGAL MACHINE.

SPECIFICATION forming part of Letters Patent No. 582,437, dated May 11, 1897.

Application filed December 26, 1891. Serial No. 416,085. (No model.) Patented in Sweden May 25, 1891, No. 3,675; in Germany August 4, 1891, No. 63,286; in France November 27, 1891, No. 217,709; in England December 1, 1891, No. 20,959; in Norway December 2, 1891, No. 2,988; in Belgium December 17, 1891, No. 97,607; in Victoria June 24, 1892, No. 9,752; in New South Wales June 27, 1892, No. 3,829; in Austria-Hungary November 2, 1892, No. 19,146 and No. 42,058; in Queensland September 4, 1893, No. 2,132, and in Finland September 28, 1893, No. 480.

*To all whom it may concern:*

Be it known that I, ERIK GUSTAF NICOLAUS SALENIUS, a subject of the King of Sweden and Norway, residing at Stockholm, in the Kingdom of Sweden, have invented certain new and useful Improvements in Apparatus for Continuously Pasteurizing Milk Simultaneously with the Separation or Churning Thereof, (for which patents have been granted to me in Sweden, No. 3,675, dated May 25, 1891; in Norway, No. 2,988, dated December 2, 1891; in Germany, No. 63,286, dated August 4, 1891; in France, No. 217,709, dated November 27, 1891; in Great Britain, No. 20,959, dated December 1, 1891; in Austria-Hungary, No. 19,146 and No. 42,058, dated November 2, 1892; in Belgium, No. 97,607, dated December 17, 1891; in Victoria, No. 9,752, dated June 24, 1892; in New South Wales, No. 3,829, dated June 27, 1892; in Queensland, No. 2,132, dated September 4, 1893, and in Finland, No. 480, dated September 28, 1893,) of which the following is a specification.

In the treatment of liquids, and notably milk, in a centrifugal apparatus for separating or churning the operation can often be facilitated by heating or cooling, as the case may be, the milk or other liquid being treated. To this end the centrifugal apparatus is usually combined in some manner with a heater or cooler; and the present invention relates to a centrifugal apparatus wherein suitable vessels or receptacles, usually in the nature of pipes or compartments, are arranged in the rotating drum of the apparatus and provided with suitable inlets or outlets for a temperature-changing fluid.

The present invention consists in providing the drum with a series of detached receptacles or vessels made of thin material and each having an inlet and outlet conduit for the fluid, these vessels being set in the drum away from its outer wall, so that the milk or cream may have the maximum contact with their walls. The vessels have no communication with the drum, but are so placed as to be wholly or partially immersed in the milk or other liquid in the drum under treatment, so that the temperature of the latter may be regulated. For example, in the separation of cream from blue milk the milk introduced into the drum for separation will be maintained at a temperature best suited for separation by means of the temperature-regulating fluid in the said vessels in the drum, or, in the case of simultaneously separating the cream and churning it, and also pasteurizing the milk and butter produced therefrom, the milk, previously heated to the pasteurizing temperature and then introduced into one compartment of the drum of the apparatus, will have its temperature lowered by the temperature-regulating liquid to that best suited for separation, after which the cream, flowing into another compartment of the drum, will have its temperature regulated therein by the same means to the degree best suited for churning.

My improvements are designed and adapted especially for application to continuously-operating centrifugal creamers and butter-extractors, and in the accompanying drawings I have illustrated two forms of centrifugal apparatuses embodying the invention.

For example, Figures 1 and 2 show the application of the improvements to a simple centrifugal creamer with but one drum or chamber, while Figs. 3 and 4 illustrate the application of the improvements to a butter extractor or separator wherein there are two superposed chambers in the drum—viz., a cream-separating chamber and a butter-separating chamber.

In the drawings, Fig. 1 is a vertical axial section of the drum of a centrifugal machine provided with my improvements, and Fig. 2 is a cross-section of the same. Figs. 3 and 4 are views similar to Figs. 1 and 2, illustrating another embodiment of my invention.

Referring primarily to Figs. 1 and 2, wherein my improvements are shown applied to a centrifugal creamer or machine having but one rotating drum or chamber, A is that drum, provided with a shallow annular chamber E in its bottom surrounding a second cup-like chamber E', axially formed therein. To the inner cup-like chamber E' leads a pipe F' from the supply-reservoir, whereby the unskimmed milk is conveyed into the apparatus, and from the lower end of said chamber leads a second pipe C' to the interior of drum A, whereby the milk is supplied thereto.

B B are thin sheet-metal vessels or receptacles preferably arranged in a circle in the chamber or drum A, which vessels serve to contain the cooling or heating medium for regulating the temperature of the milk in said chamber, said medium being supplied, as herein shown, through a pipe F to chamber E and thence through nipples D to the respective mouths C at the bases of the vessels B, the centrifugal force causing said medium, when a liquid is used, to flow upward through said vessels and out through an outlet $C^2$, opening from the upper end thereof. In this manner a constant circulation of the temperature-regulating medium is kept up through the vessels and the temperature of the contents of the drum A maintained at the desired point. As a temperature-regulating medium I may employ any ordinary liquid or gas capable of absorbing or giving off a considerable degree of heat without change of state—as water, for example, air, &c., heated or cooled artificially; or some substance capable of a ready change of state may be employed, and in such case solids may be employed—as, for instance, any of the well-known freezing mixtures—which will then be packed into the vessels B and allowed to act on the contents of the drum without removal during the operation.

In order to facilitate the radiation or absorption of heat by the walls of the vessels B, these walls may be made of some very conductive metal and may be enlarged by the formation of points, as $b$, or wings, as $d$. (Seen in Fig. 1.)

In lieu of passing the regulating medium in at the bottom of the vessels B it may be introduced at the tops thereof, as illustrated in dotted lines in Fig. 1. In this case a chamber G' will be formed about the neck of the drum in lieu of chamber E, and to this chamber the medium is supplied by a pipe G, as seen in dotted lines. A nipple $G^2$ leads from chamber G' to the upper part of vessel B, and an outlet-pipe $G^3$ leads from the base of said vessel out of the apparatus. Thus it will be seen that the temperature-regulating medium is fed to the vessel B at the top, descends through them, and escapes through outlet-tubes $G^3$, as indicated by the arrow in Fig. 1.

In the construction seen in Fig. 3 the drum of the centrifugal apparatus is divided by a horizontal partition into two chambers A' B', to one of which the unskimmed milk is introduced for separation of the cream, which is then led into the other chamber for the production of the butter in any of the well-known methods of centrifugal churning processes. In this construction I find it advantageous to supply the drum with two sets of vessels B, one set arranged in each chamber, and to provide an annular ring-like chamber adapted to receive the supply of the heat-regulating medium for each set of said vessels. These chambers $E^2$ are, as seen in Fig. 3, arranged one at the top and the other on the bottom of the drum of the centrifugal apparatus, and to these chambers, which are exactly similar, the liquid medium is supplied through tubes, and under the influence of the centrifugal force is forced through tubes $C^3$ into the temperature-regulating vessels. These vessels are divided vertically by partitions, as illustrated in Fig. 3, so that the medium flows from the tube $C^3$ along the whole length of said partition on one side, and turning thereabout, as indicated by the arrows, flows back on the other side of said partition and out at the outlet-pipe $C^4$. The operation will be readily understood. In lieu of regulating the temperature of both chambers to the same degree it is obvious that a higher temperature may be maintained in one of said chambers than in the other, as the exigencies of different processes may require. Further, the temperature may be varied from time to time at various stages of the process, if such variation be required.

From the above it will be understood that by means of the described process the milk which is in the course of being separated in a centrifugal apparatus may be maintained at that uniform temperature which is the most suitable for the separation and under which no injurious variations occur.

It is often the case that when milk is to be separated quantities of milk of different temperatures are thrown into one vessel, from which it afterward, without mixing, is allowed to run into the centrifugal apparatus, and in consequence thereof it happens that the milk which enters the drum has different temperatures at different times or periods in the operation. Such variations may be easily avoided by the use of my apparatus. When churning continuously in a centrifugal apparatus, it is also possible to maintain the cream to be churned, and especially the inner cream layer, at the temperature which is most suitable for the churning.

In a centrifugal apparatus having two compartments it is possible, with the aid of the described apparatus, to maintain the milk in the one compartment where the separation takes place at a separating temperature and the cream flowing from this compartment into the other where it is churned at a churning temperature.

I do not wish to be understood as limiting myself to any particular medium for regulating the temperature of the contents of the drum during the centrifugal operation, as it will be seen that a great variety of substances may be employed for this purpose. As I have stated, however, I believe such substances as water, air, or freezing mixtures to be particularly well adapted for the purpose. Nor do I wish to be understood as limiting myself to any particular form of the vessels B to be employed. It will be understood, however, that in all cases these vessels rotate with the drum.

Having thus described my invention, I claim—

1. In a centrifugal apparatus for treating milk, the combination with the rotating drum of said apparatus, of a series of detached vessels or receptacles of thin material placed in said drum and adapted to contain a temperature-regulating medium, said vessels having no communication with the drum and being provided with inlet and outlet conduits for the fluid medium, substantially as and for the purposes set forth.

2. In a centrifugal apparatus for treating milk, the combination with the rotating drum of said apparatus, of a series of vessels B, placed removably in said drum and adapted to contain a temperature-regulating medium, said vessels rotating with, but having no communication with the drum, and being constructed of thin material and provided with inlet and outlet conduits, substantially as and for the purposes set forth.

3. In a centrifugal apparatus for treating milk, the combination with the rotating drum of said apparatus, of a series of detached receptacles of thin material placed in said drum, but not in communication therewith, and situated therein at a distance from the outer wall thereof whereby they may be completely surrounded by the milk or cream, said receptacles having inlet and outlet conduits for the fluid, temperature-regulating medium, substantially as and for the purposes set forth.

In witness whereof I have hereunto signed my name in the presence of two subscribing witnesses.

ERIK GUSTAF NICOLAUS SALENIUS.

Witnesses:
ERNST SVANGVIST,
C. W. ERDMAN.